(12) United States Patent
Preu

(10) Patent No.: US 11,239,538 B2
(45) Date of Patent: Feb. 1, 2022

(54) PHOTONIC INTEGRATED CIRCUIT COMPRISING A DIELECTRIC WAVEGUIDE ON A SUBSTRATE INCLUDING A LOCAL FUNCTIONALIZATION TO ENABLE METALLIZATION-FREE THZ WAVE PROPAGATION

(71) Applicant: Technische Universität Darmstadt, Darmstadt (DE)

(72) Inventor: Sascha Preu, Darmstadt (DE)

(73) Assignee: Technische Universität Darmstadt, Darmstadt (DE)

( * ) Notice: Subject to any disclaimer, the term of this patent is extended or adjusted under 35 U.S.C. 154(b) by 23 days.

(21) Appl. No.: 16/796,343

(22) Filed: Feb. 20, 2020

(65) Prior Publication Data
US 2020/0274220 A1  Aug. 27, 2020

(30) Foreign Application Priority Data

Feb. 27, 2019  (DE) ...................... 10 2019 104 982.2

(51) Int. Cl.
| | |
|---|---|
| *H01P 3/16* | (2006.01) |
| *H01P 3/20* | (2006.01) |
| *H01P 11/00* | (2006.01) |
| *H01P 5/12* | (2006.01) |
| *H01Q 13/08* | (2006.01) |

(52) U.S. Cl.
CPC ................. *H01P 3/16* (2013.01); *H01P 3/20* (2013.01); *H01P 5/12* (2013.01); *H01P 11/006* (2013.01); *H01Q 13/085* (2013.01)

(58) Field of Classification Search
CPC ............. H01P 3/16; H01P 5/12; H01P 11/006
USPC ................................... 333/239, 248
See application file for complete search history.

(56) References Cited

U.S. PATENT DOCUMENTS

| | | | | |
|---|---|---|---|---|
| 3,995,238 A | * | 11/1976 | Knox et al. ............... | H01P 1/16 333/21 R |
| 4,677,404 A | * | 6/1987 | Sequeira ................... | H01P 1/10 333/238 |
| 2011/0069969 A1 | | 3/2011 | Hochberg et al. | |
| 2013/0265733 A1 | * | 10/2013 | Herbsommer et al. ..................... | G02B 6/12004 361/774 |
| 2014/0368301 A1 | * | 12/2014 | Herbsommer et al. ... | H01P 3/16 333/239 |

(Continued)

OTHER PUBLICATIONS

Biglarbegian, B., Basha, M., Taeb, A., Gigoyan, S. and Safavi-naeini, S. (2014), Silicon-based integrated millimeter-wave CPW-to-dielectric image-guide transition. Int J RF and Microwave Comp Aid Eng, 24: 490-497. doi:10.1002/mmce.20790.

(Continued)

*Primary Examiner* — Benny T Lee
(74) *Attorney, Agent, or Firm* — Smartpat PLC

(57) ABSTRACT

A photonic integrated circuit is disclosed comprising: a dielectric substrate (110); a dielectric waveguide arrangement (120) on the substrate (110) for guiding terahertz (THz) waves; and a local functionalization (130) having a metallization in a surface area of the dielectric waveguide arrangement (120). The metallization is localized along a propagation direction of the THz waves to allow a metallization-free propagation of the THz wave outside of the local functionalization.

8 Claims, 3 Drawing Sheets

(56) References Cited

U.S. PATENT DOCUMENTS

2015/0295299 A1* 10/2015 Herbsommer .......... H01P 3/122
333/135

OTHER PUBLICATIONS

Cetin, Ali. (2015). Investigation of Electromagnetic Wave Propagation in Si-SiO2 Embedded Waveguide. Journal of Multidisciplinary Engineering Science and Technology (JMEST). 2. 3404-3407.
European Patent Office, Partial European Search Report, EP 20 15 9446, dated Aug. 24, 2020.
Kenneth, K.O. (2011). Sub-millimeter wave CMOS integrated circuits and systems. 2011 IEEE International Symposium on Radio-Frequency Integration Technology, 1-8.
Ranjkesh, N., et al. ,Millimeter-wave silicon-on-glass integrated technology. In: 2014 IEEE International Microwave and RF Conference (IMaRC). IEEE, 2014. pp. 233-236.

* cited by examiner

PHOTONIC INTEGRATED CIRCUIT COMPRISING A DIELECTRIC WAVEGUIDE ON A SUBSTRATE INCLUDING A LOCAL FUNCTIONALIZATION TO ENABLE METALLIZATION-FREE THZ WAVE PROPAGATION

TECHNICAL FIELD

The present invention relates to a photonic integrated circuit and a method for its manufacture or utilization.

BACKGROUND

Waveguide structures and especially functionalized waveguides are highly relevant structures that are used over many frequency ranges, from microwave radiation over terahertz (100 GHz-10 THz) to optics in the visible range. Metallic hollow waveguides are used in the microwave range and partly also in the terahertz range. The waveguides consist of a metal block in which the waveguide, often with a rectangular cross-section, is milled out and usually filled with air.

The hollow waveguide should have a width of at least $\lambda/2$ ($\lambda$ is the wavelength of the respective wave) in order to be able to propagate a mode. This defines the lower frequency limit for a given geometry. Below this frequency, no mode can propagate or the wave is exponentially dampened. The upper frequency limit results from the oscillation of undesired higher propagation modes. Although these modes can propagate, components integrated into the waveguide, such as frequency multipliers or beam splitters, are adapted to the ground mode and are inefficient in higher modes.

Typical functionalizations are switches, beam splitters, microstrip transitions having integrated frequency multipliers or IF mixers (IF=intermediate frequency), horn antennas for radiation and more.

Disadvantages of hollow waveguides are the increasing losses at THz frequencies and the production costs, since the hollow waveguides are often manufactured mechanically, e.g. by milling. This process is not scalable and with higher frequency (smaller dimensions) requires increasingly better manufacturing accuracy, which should be at a fraction of the operating wavelength $\lambda$. While at 10 GHz the wavelength is 3 cm, leaving room for manufacturing tolerances, at 1 THz the wavelength is only 300 μm, so that manufacturing requires high accuracy.

Further disadvantages of hollow waveguides are the losses, which increase strongly with the operating frequency. In addition to pure line losses, increases in surface roughness and the skin effect are playing an important role. The losses can be orders of magnitude higher than the purely metallic line losses with an ideal structure at lower frequencies.

Planar waveguides, such as microstrip lines and coplanar waveguides are also highly lossy at higher THz frequencies.

Therefore, there is a need for further functionalized waveguide structures that can be used for the THz range (100 GHz-10 THz) and overcome at least some of the problems mentioned above.

SUMMARY OF THE INVENTION

At least part of the problems mentioned above can be solved by a photonic integrated circuit as disclosed and a method for manufacture or utilization of the photonic integrated circuit as disclosed.

The present invention relates to a photonic integrated circuit having a dielectric substrate, a dielectric waveguide arrangement on the substrate for guiding terahertz (THz-) waves and a local functionalization which has a metallization in a surface area of the dielectric waveguide arrangement. The metallization is localized along a propagation direction of the THz waves to allow a metallization-free propagation of the THz wave outside of the local functionalization. The term "metallization-free" means that further structures that force a null of the electric field strength (such as metal or other materials having a sufficient number of free charge carriers) are sufficiently far away that the further structures do not influence the THz wave.

The term "photonic" should mean that the signal propagation is based on photons, using in particular frequencies in the THz range (100 GHz-10 THz). It also serves as a demarcation to electrical lines. In order for the dielectric waveguide arrangement to efficiently guide these THz waves, the dielectric waveguide arrangement has, in particular, a width or height perpendicular to the propagation direction of the THz wave, which is, for example, in a range from 10 μm to 300 μm or in a range from 30 μm to 100 μm (or is approx. 50 μm). In addition, a material can be selected for the waveguide arrangement whose refraction index is at least 1.5× as high as a refractive index of the (adjacent) dielectric substrate. For the dielectric substrate, for example, PE (polyethylene) with a refraction index n(PE)=1.4-1.6 or quartz (n=2.15) can be used and as material for the waveguide arrangement, for example, silicon with a refraction index of n(Si)=3.416.

According to embodiments, there is no continuous metal layer arranged along the standard waveguide on or in the proximity of the waveguide, since this would otherwise have a negative effect on the wave propagation. Only where a certain functionalization is desired, a metallization is formed according to embodiments. In particular, the metallization can only be formed on one side of the waveguide structure to cause a shift of the THz wave. Further functionalizations relate in particular to curved surface areas of the waveguides, since modes are often suppressed or a mode conversion of the THz waves is to be performed there. Such curvatures can be accompanied by a change (e.g. reduction) of the cross-sectional surface perpendicular to the propagation direction.

According to embodiments, the local functionalization can refer to one or a plurality of the following elements: Waveguides having a modified mode structure, switches, beam splitters, polarizers, transitions to hollow waveguides, microstrip lines or coplanar waveguides having integrated frequency multipliers or IF mixers (IF=intermediate frequency), horn antennas for radiation and more. In the implementation of these elements the local functionalization causes for example: a suppression of higher modes of the THz waves, a coupling or uncoupling or decoupling of modes of the THz waves, a transfer of a mode of the THz wave into another mode etc.

For example, the waveguide arrangement may optionally have a bifurcation (e.g. of a beam splitter) having a branching point and the surface area of the local functionalization may be formed by opposing surfaces adjacent to the branching point.

The photonic integrated circuit can also have a device (e.g. a diode or another active element) for generating and/or for receiving a THz oscillation and the waveguide arrangement can, for example, have a Vivaldi antenna coupling to the device and, starting from the diode, a widening opening portion for radiation of a coupled THz wave. In this embodiment the metallization can be formed on both sides of the widening opening portion to support a coupling of the THz oscillation from the device into the Vivaldi antenna and finally into the dielectric waveguide. The device (e.g. a diode or another active element) can act as a source and/or as a detector for the THz oscillations.

The photonic integrated circuit may also have at least one THz resonator which has a dielectric material and is arranged along the substrate laterally offset from the waveguide arrangement. In particular, a gap may be formed in between. Optionally, an underlay or a shielding layer (e.g. made of a metal) is also arranged on an opposing side of the substrate relative to the THz resonator. The material of the resonator also has a higher refraction number than the substrate and is optionally formed from the same material as the waveguide arrangement. In this embodiment, the metallization can be formed locally in the area of a minimum distance between the waveguide arrangement and the THz resonator, namely on a surface of the waveguide arrangement opposing the substrate or the THz resonator. Therefore the coupling of the THz wave into the resonator is facilitated.

Optionally, a further dielectric substrate is formed in the circuit, wherein the dielectric waveguide arrangement is arranged between the dielectric substrate and the further dielectric substrate. A refraction index of the further dielectric substrate can be at least a factor of 1.5 lower than a refractive index of the dielectric waveguide arrangement.

Embodiments also relate to a method for manufacturing a photonic integrated circuit. The method comprises the following steps:
providing a dielectric substrate;
forming a dielectric waveguide arrangement on the substrate for guiding THz waves; and
functionalizing a locally restricted surface area of the dielectric waveguide arrangement by forming a metallization on the local surface area.

The manufacture can be performed in particular by using a lithography for structuring and/or an etching process or a laser cutting process and/or a gluing of dielectric layers or evaporating metals or applying conductive layers by means of additive production. Hereby the small dimensions (30 ... 70 μm) of the waveguides can be achieved.

Further embodiments also relate to a method for guiding THz waves using a photonic integrated circuit as described above, wherein at least one of the following is achieved by local functionalization by means of metallization:
suppressing higher modes of the THz waves;
coupling or uncoupling or decoupling of modes of the THz waves;
transferring a mode of the THz wave to another mode.

Embodiments solve the problems of conventional hollow waveguides mentioned at the beginning by using dielectric waveguides, which have only a local metallization. As is the case of conventional waveguides made of glass fibers, the waveguide material has a (preferably) high refraction number, nK, and low dielectric losses, while the surrounding material (e.g. the substrate acting as sheathing) has a (preferably) lower refraction number, nM, so that the wave is propagated by means of total reflection. Ideally, the difference in the refraction numbers is as large as possible, and the high refraction number is at least more than 50% or more than 100% or more than 150% larger than the low refraction number.

Both monomodal (mainly one mode is to be propagated) and multimodal (more than one mode is to be propagated) waveguides can be used according to embodiments. The functionalized areas can be produced in a planar geometry and then coupled to the waveguide. During manufacture, the structuring of the waveguide and/or the metallization can be performed lithographically according to embodiments in order to achieve the desired function.

In further embodiments the refraction index of the substrate material is locally increased by surface modification instead of the material of higher refraction index (waveguide material). This can also be achieved using lithographic techniques.

Embodiments can be used in many different ways. Thus, with local functionalization, the following components can be integrated into a given circuit: passive members such as beam splitters, delay sections, interferometers, filters or resonators, as well as active components such as phase shift lasers or amplifiers and more.

BRIEF DESCRIPTION OF THE DRAWINGS

The embodiments of the present invention will be understood better by means of the following detailed description and the accompanying drawings of the different embodiments. The disclosure is not limited to the specific embodiments. Rather, the disclosed embodiments serve the purpose of explanation and understanding.

DETAILED DESCRIPTION OF THE INVENTION

Figure 4:
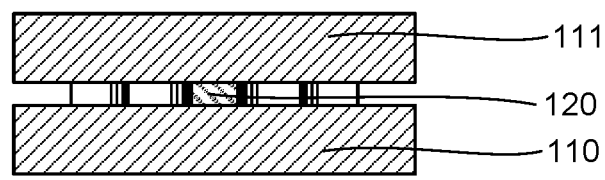
FIG. 4 is a front view of the photonic integrated circuit as in FIG. 1.

According to embodiments, different waveguide structures are structured, e.g. by means of lithography, and locally functionalized by means of metallization. For example, on a ground structure (substrate) of a low-loss substrate dielectric (e.g. polyethylene or quartz) a structured waveguide (waveguide arrangement) can be formed from a low-loss dielectric of higher refraction number. For example high resistivity float zone silicon (HRFZ Si), silicon carbide, gallium arsenide, aluminum oxide etc. can be used as material for the waveguide. The substrate also only needs to be used in sections and can be combined with other structures. Referring to FIG. 4, it is also possible to create covered basic structures, where the waveguide arrangement 120 is arranged between two substrates 110, 111 (e.g. of the same material), wherein the functionalization can be formed locally between one of the substrates 110 or 111 and the waveguide. A refraction index of the further dielectric substrate 111 is at least a factor of 1.5 lower than a refraction index of the dielectric waveguide arrangement 120.

Figure 1:
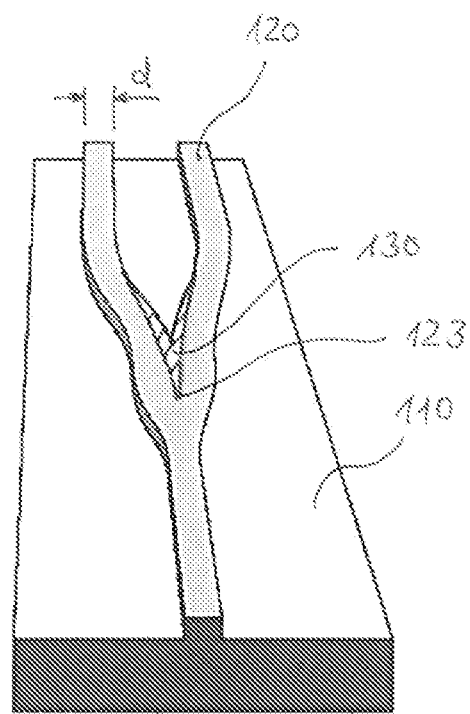
FIG. 1 shows an embodiment of the photonic integrated circuit.

FIG. 1 shows a photonic integrated circuit according to an embodiment of the present invention. The circuit comprises: a dielectric substrate 110; a dielectric waveguide arrangement 120 on the substrate 110 for guiding terahertz (THz) waves and a local functionalization 130 which has a metallization in a surface area of the dielectric waveguide arrangement 120. The metallization 130 is localized along a propagation direction of the THz waves to allow metallization-free propagation of the THz wave outside the local functionalization.

In the embodiment of FIG. 1, the waveguide arrangement 120 comprises a bifurcation having a branching point 123 and the surface area of the local functionalization 130 is formed by opposing surfaces adjacent to the branching point 123. This structure can be used, for example, as a beam splitter, wherein the metallic structure 130 improves the beam splitting property and makes the beam splitter broadband while keeping the splitting factor as constant as possible.

In addition, the dielectric waveguide arrangement 120 here and in other embodiments can have an width or height d perpendicular to the propagation direction of a THz wave, which is in a range from 10 µm to 300 µm or in a range from 30 µm to 100 µm. For example, the material of the waveguide 120 has a refraction index (refraction number) that is at least 1.5 as high as a refraction index of the dielectric substrate 110, in order to keep the THz wave efficiently in the waveguide 120.

According to embodiments, the waveguide 120 and its surroundings should be mostly pure dielectric. The circuit could of course have further distant metallic structures. However, the desired metallization-free propagation should mean that the THz wave is not influenced by free charge carriers that may occur in metals as well as in other guides. Since free, easily movable charge carriers, which are present in large numbers in metals, force a null of the electric field strength (they are field-free inside), higher modes are suppressed or at least shifted (away from the metallization) by the metallization. In addition, the metallization sets even modes to null, while odd modes are suppressed with increasing height, as their maxima increasingly approach the metallization. All these effects lead to losses that avoid embodiments or that are used specifically for functionalization.

Figure 2:
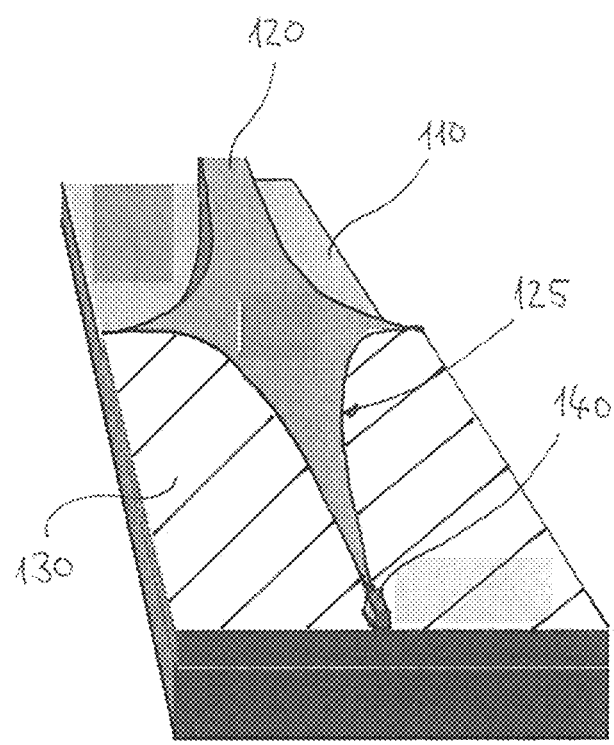
FIG. 2 shows a further embodiment of the photonic integrated circuit with a coupling of an exemplary diode.

FIG. 2 shows a further embodiment of the photonic integrated circuit, which has an exemplary diode 140 for generating a THz oscillation. In this embodiment, the waveguide arrangement 120 is formed as a Vivaldi antenna which couples to the diode 140 and, starting from the diode 140, has a widening opening portion 125 for radiating a coupled THz wave. The metallization 130 is formed here on both sides of the widening opening portion 125 to support a coupling of the THz oscillation from the diode 140 into the Vivaldi antenna.

This embodiment shows only as an example a THz emitter diode as a possible active element, which couples power with a Vivaldi antenna into an underlying dielectric waveguide. According to further embodiments, other active elements can also be efficiently coupled to the waveguide arrangement 110 by means of local functionalization 130.

Figure 3:
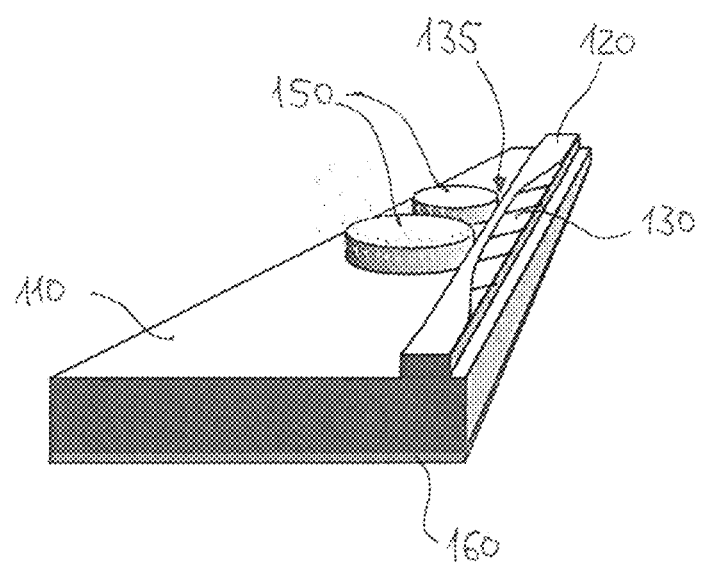
FIG. 3 shows a further embodiment of the photonic integrated circuit with the coupling of an exemplary THz resonator.

Thus FIG. 3 shows a further embodiment of the photonic integrated circuit, which has at least one THz resonator 150. The resonator 150 also has a dielectric material having a higher refraction number than the substrate 110 and is arranged along the substrate 110 laterally offset from the waveguide arrangement 120. For example, a gap 135 can be formed between the resonator 150 and the waveguide arrangement 120 in such a manner that there is no direct contact between the two components. In addition, the resonator 150 can, for example, be formed from the same material as the waveguide 120.

In this embodiment, an optional underlay 160 is also formed on a back side of the substrate 110 (on a side of the substrate 110 opposing the THz resonator 150). Such an underlay 160 provides not only mechanical support or hold, but can also provide shielding from external influences that could interfere with the photonic signals. Such an underlay/shielding layer can also be formed in the embodiments from FIG. 1 or FIG. 2. This shielding layer/underlay may have a metal, for example, wherein the distance to the waveguide should be chosen sufficiently large (distance of at least a plurality of THz wavelengths) such that the influence on the THz wave is negligible due to the exponential damping.

The metallization 130 is in turn only formed locally in an area where the distance between the waveguide arrangement 120 and the THz resonator 150 is the smallest. The metallization 130 can again be formed on a surface of the waveguide arrangement 120 which is opposing the substrate 110 and/or the THz resonator 150. With this metallization 130, in turn, certain modes of the THz waves are specifically suppressed or the wave is formed in such a manner that the wave migrates towards the resonator 150, which facilitates the coupling.

The purely dielectric resonator 150, which was locally functionalized by means of metallization 130, therefore couples efficiently to the dielectric waveguide 120, the metallization layer 130 on the waveguide 120 pushes the mode towards the resonator 150 to improve the coupling.

Embodiments have a number of advantages over conventional circuits. In particular, these are based on the combination of dielectric waveguide structures 120, which are similar to optical photonic integrated circuits, and the metallic structures 130, which can be manufactured by contact lithography or similar lithography techniques. Therefore, a considerable scalability is already given.

In addition, it is advantageous that the wave guidance occurs primarily in the low-loss dielectric (the waveguide 120), while the metallic additives (metallizations 130 as functionalizations) reduce the losses, e.g. in curved structures (as in FIG. 1), suppress undesired modes or simply allow interfaces to other components (as in FIG. 2 or FIG. 3). These include GSG (ground-signal-ground) probes or other metallic conductor structures.

A mixture of metallic and dielectric structures can also provide advantages for the improved radiation. The invention does not require that metallic structures 130 be present everywhere on the waveguide 120. They are mainly used to improve desired properties such as the components integrated into the waveguide structure 120.

According to embodiments, the functionalization 130 (e.g. metallization) could be on both sides of the dielectric waveguide arrangement 120. However, advantageously, the functionalization 130 is formed directly on the surface of the dielectric waveguide arrangement 120 (e.g. by evaporation on the waveguide arrangement 120). Since a metal surface sets the electric field to zero, the metallization directly on the waveguide arrangement 120 will yield the desired functionalization 130 by the interaction of the electro-magnetic wave in the waveguide 120 with the surface of the waveguide 120.

In contrast to non-linear waveguides with nonlinear optical characteristics (e.g. with respect to the susceptibility) that are influenced by an applied electric field passing through the waveguide, according to embodiments, the exemplary metallization 130 may not generate an electric field strength in the dielectric waveguide arrangement 120. In other words, according to embodiments, no voltage is applied on or between components of the metallization 130, but, optionally, they may be set on a common voltage level (e.g. ground) or its potential level is freely floating. According to further embodiments the dielectric waveguide arrangement 120 comprises a material with a refractive index that may be independent of an external electric field (DC or AC).

However, according to yet another embodiment, an DC and/or AC voltage may be applied on or between the metal components of the functionalization 130, which is formed directly on the surface of the dielectric waveguide arrangement 120.

Compared to conventional waveguide arrangements, the advantages of embodiments can be summarized as follows:
- The dielectric structures 110, 120 are significantly lower-loss than metallic structures at high frequencies, especially above 1 THz, if a suitable material is selected, and therefore allow the development of the higher THz range by means of photonic circuits.
- The wave guidance occurs mainly in the low-loss dielectric 120, metallic structures are usually only applied locally or at areas of the waveguide 120 where the ground mode has a low field. The latter can be advantageous to suppress higher modes, for example.
- The manufacture of the waveguide structures 120 as well as the metallic structures 130 can be performed by means of lithography, if necessary also by laser processing. Especially the lithographic manufacture allows a scaling of examples with hardly any additional effort and is therefore—on a large scale—significantly cheaper than hollow waveguides.
- The planar structure and the manufacture with lithographic techniques allow a variety of components, such as those used in optical photonic integrated circuits.
- Due to a very high refraction difference between the carrier substrate 110 (e.g. n(PE)=1.4-1.6) and the waveguide material 120 (e.g. n(Si)=3.416) very large bandwidths can be achieved. Tests have shown that a bandwidth of at least a factor 2 or even a factor 4 between lower and upper frequency limits is possible in circuits according to embodiments. Even greater single-mode bandwidths can be achieved with suitable metallic structures 130 on the dielectric waveguide, which prevent coupling into higher modes.

The manufacture of the structures can be performed with a variety of methods, e.g. UV contact lithography, UV projection lithography, UV laser lithography, laser ablation, electron beam lithography, possibly even additive manufacturing, as far as low-loss dielectrics become printable, and more.

In the following, the manufacture by means of UV contact lithography is only shown as an example:
- The material with higher refraction number (waveguide 120) is glued to the material with lower refraction number (substrate 110). If necessary, a rigid underlay 160, e.g. metal, is glued under the material to ensure mechanical stability. The thickness of the dielectric materials can be selected in such a manner that the exponentially decaying wave in the material of lower refraction number has decayed sufficiently well. Alternatively, for manufacturing reasons, the material having a low refraction number can be selected thinner and, after completion of the lithography, be glued onto a thicker substrate of the same or optically similar material.
- A UV-sensitive coating can be applied to the layer stack by means of a spin coater. Common UV coatings such as SU8, AZ 6632 or thicker and many more are possible.
- The metallic structure 130 can be exposed or evaporated. The coating and excess metal can be removed by means of lift-off
- The sample can then be recoated.
- The structures to be etched can be defined lithographically.
- For example, the high index material (waveguide 120) can be etched, e.g. with an RIE/ICP process (RIE=reactive ion etching; ICP=inductively coupled plasma; Si e.g. with a Bosch process).
- Coating residues can finally be removed, e.g. by means of solvents or oxygen plasma.

Optionally, a further material similar to the material having a lower refraction number (substrate 110) can be applied to the structured sample. The waveguide arrangement 120 can therefore be arranged between two dielectric substrates having a low refraction number (e.g. less than half of the refraction number of the waveguide material 120).

Likewise, further metallic structures can optionally be applied to the substrate 120 (material of lower refraction number).

The upper layer and the lower layer can consist of materials of the same or very similar refraction number, while the middle material should have a significantly higher refraction number. This allows for a significant increase in bandwidth, as substrate modes are suppressed.

The features of the invention disclosed in the description, the claims and the drawings may be essential for the realization of the invention either individually or in any combination.

LIST OF REFERENCE SYMBOLS

110 dielectric substrate
111 further dielectric substrate
120 dielectric waveguide arrangement
123 branching point of a beam splitter
125 opening portion of a Vivaldi antenna
130 local functionalization (metallization)
135 gap
140 active element (e.g. diode)
150 resonator
160 underlay; shielding layer
d width, height of the waveguide

What is claimed is:

1. A photonic integrated circuit, comprising:
    a dielectric substrate;
    a dielectric waveguide arrangement on the substrate for guiding terahertz waves;
    a local functionalization which includes a metallization in a surface area of the dielectric waveguide arrangement, wherein the metallization is localized along a propagation direction of the THz waves to enable metallization-free propagation of the THz wave outside of the local functionalization; and
    a further dielectric substrate, wherein the dielectric waveguide arrangement is arranged between the dielectric substrate and the further dielectric substrate, and wherein a refraction index of the further dielectric substrate is at least a factor of 1.5 lower than a refraction index of the dielectric waveguide arrangement.

2. The photonic integrated circuit according to claim 1, wherein
    the dielectric waveguide arrangement has a width perpendicular to the propagation direction of the THz wave which is in a range from 10 µm to 300 µm or in a range from 30 µm to 100 µm, and includes a material whose refraction index is at least 1.5 times as high as a refraction index of the dielectric substrate.

3. The photonic integrated circuit according to claim 1, wherein the dielectric waveguide arrangement includes a bifurcation having a branching point, and the surface area of the local functionalization is formed by opposing surfaces adjacent to the branching point.

4. The photonic integrated circuit according to claim 1, further comprising
a diode for generating a THz oscillation,
wherein the dielectric waveguide arrangement forms a Vivaldi antenna which couples to the diode and, starting from the diode, includes a widening opening portion for radiation of the THz wave,
and wherein the metallization is formed on both sides of the widening opening portion to support coupling of the THz oscillation from the diode into the Vivaldi antenna.

5. The photonic integrated circuit according to claim 1, further comprising:
a THz resonator and an underlay, wherein the THz resonator includes a dielectric material with a higher refraction number than the substrate and is arranged along the substrate laterally offset from the dielectric waveguide arrangement and the underlay is arranged on a side of the substrate opposing the THz resonator,
wherein the metallization is formed locally in the area of a smallest distance between the dielectric waveguide arrangement and the THz resonator on a surface of the dielectric waveguide arrangement opposing the substrate and/or the THz resonator.

6. The photonic integrated circuit according to claim 1, wherein the local functionalization by metallization effects at least one of the following:
suppressing higher modes of the THz waves;
coupling or uncoupling or decoupling of modes of the THz waves;
transferring a mode of the THz wave to another mode.

7. A method for manufacturing a photonic integrated circuit, comprising:
providing a dielectric substrate;
forming a dielectric waveguide arrangement on the substrate for guiding THz waves; and
functionalizing a locally restricted surface area of the dielectric waveguide arrangement by forming a metallization on the local surface area;
wherein forming the dielectric waveguide arrangement (120) and forming the metallization (130) comprises one of lithographic structuring, etching, gluing of dielectric layers, and evaporating metals.

8. A photonic integrated circuit, comprising:
a dielectric substrate;
a dielectric waveguide arrangement on the substrate for guiding terahertz (THz) waves;
a local functionalization which includes a metallization in a surface area of the dielectric waveguide arrangement, wherein the metallization is localized along a propagation direction of the THz waves to enable metallization-free propagation of the THz wave outside of the local functionalization; and
a diode for generating a THz oscillation,
wherein the dielectric waveguide arrangement forms a Vivaldi antenna which couples to the diode and, starting from the diode, includes a widening opening portion for radiation of the THz wave,
and wherein the metallization is formed on both sides of the widening opening portion to support coupling of the THz oscillation from the diode into the Vivaldi antenna.

* * * * *